R. Shaler,

Parlor Skate,

No. 1,639, Reissued Mar. 15, 1864.

Witnesses:
Joseph Gewatt.
W. L. Dennem.

Inventor:
R. Shaler.
by his attorney
E. S. Renwick.

UNITED STATES PATENT OFFICE.

REUBEN SHALER, OF MADISON, CONN., ASSIGNOR TO ORASMUS M. VAIL, OF BROOKLYN, N. Y., AND THOMAS J. VAIL, OF HARTFORD, CONN.

IMPROVEMENT IN WHEEL-SKATES.

Specification forming part of Letters Patent No. 28,509, dated February 24, 1860; Reissue No. 1,639, dated March 15, 1864.

*To all whom it may concern:*

Be it known that I, REUBEN SHALER, of Madison, in the county of New Haven and State of Connecticut, have invented an Improved Roller-Skate; and I do hereby declare that the following is a full, clear, and exact description of my said invention, reference being had to the accompanying drawings, in which—

Figure 1:
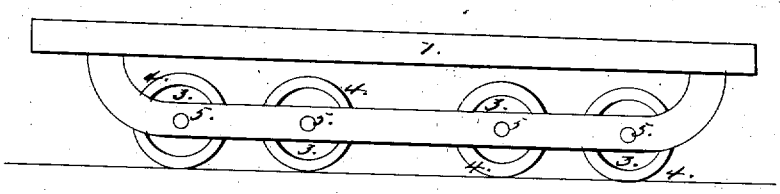
Figure 2:
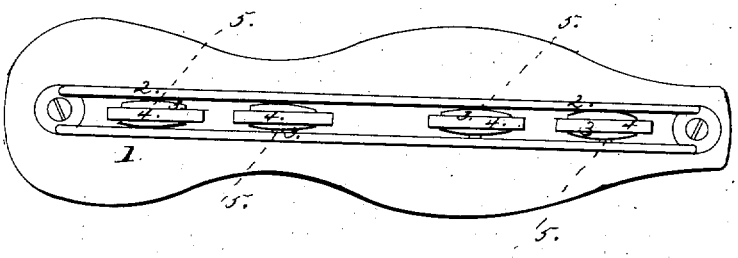
Figure 3:
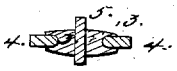

Figure 1 represents a side elevation of my improved skate. Fig. 2 represents a view of its under side; and Fig. 3 represents a section of one of the rollers, showing its construction.

Skates provided with a series of rollers in place of a runner have been known prior to my invention, but from some defect in their construction they have never been used to any considerable extent. Some of these previous roller-skates were made with rollers of hard wood, and others with metal rollers. In experimenting with such roller skates I found that although it was comparatively easy to skate forward in a straight line with skates having rollers of hard wood and of metal the difficulty of turning curves with them was so great that it was practically impossible to perform the same evolutions with them as can be performed upon ice with runner-skates. In turning curves the sole of the skate is inclined to the surface over which the skate is moved, and my experiments led me to the conclusion that the difficulty in turning curves with the old roller-skates arose from the fact that the rollers did not yield laterally to the pressure of the skater, rollers of hard wood and metal being practically rigid when exposed to the pressure of the body. In order to obtain this lateral flexibility, I combined rollers of sole-leather with the stock of the skate; but I soon found that although with such skates when first made I could turn and perform evolutions with considerable facility, when compared with the previously-known unyielding roller-skates, yet such leather roller-skates soon became useless by the incapacity in the rollers of resuming their form; and that it was necessary, in order to obtain a practicably valuable roller-skate, to combine with the skate-stock a series of rollers which were not only flexible laterally under the lateral pressure of the skater, but also possessed the capacity of regaining their form after flexure when the pressure was removed. I therefore combined with the skate-stock rollers of vulcanized india-rubber, which I found to possess the two requisites of lateral flexibility and capacity to regain their form after flexure; and my invention consists in a roller-skate which is a combination of a stock with a series of rollers possessing the two requisites of lateral flexibility and capacity to regain their form when the pressure is removed, vulcanized india-rubber or vulcanized gutta-percha—such as is used to form steam-packing—being the materials which I have found best suited for the peripheries of rollers for this purpose.

The skate represented in the accompanying drawings embodies my invention. In it the skate-stock 1 is of wood, constructed in such form and manner that it can be secured to the foot by straps in the usual way. Beneath it there are two side pieces, 2 2, which are united where they connect with the wood, and form a hanger, in which the rollers 3 4 are hung upon their axles. This hanger in the present example is secured to the stock by screws; but it may be secured otherwise, provided the connection between it and the stock be firm. The rollers are constructed with cores 3, of cast-iron, which are grooved to admit rings 4, of vulcanized india-rubber—such as that used for steam-packing—as the rollers would be too flexible if made wholly of such soft vulcanized india-rubber. The cores of the rollers may be made of iron, steel, brass, or any other suitable material—steel, perhaps, being the best, although the most costly. In constructing such rollers, rings of india-rubber are expanded sufficiently to pass over the flanges which form the sides of the grooves, are passed over these flanges, and are permitted to contract in the grooves. The rollers are secured upon axles or pins 5, fixed in the side pieces, 2 2, the roller turning upon the axle although the axle, may be fastened to the roller and arranged to turn in the side pieces, if preferred.

Roller-skates are used for skating upon floors, carpets, oil-cloths, and pavements, which are not perfectly plane surfaces, but present inequalities in such manner that some of the rollers of the series are frequently upon parts raised above the general level, while other rollers are upon parts correspondingly depressed. The flexibility and elasticity, both lateral and vertical, which skates made with such vulcanized rubber rollers possess adapts them admirably to such purposes, as those rollers upon which the greatest pressure is exerted yield the most, and thus the bearing of the weight over the whole series is more nearly equalized. The lateral flexibility of the rollers is also of great advantage in the operation of "striking out," as it is called, as it enables the rollers to hug the surface, and thus diminishes, if not prevents, the tendency to slip. These qualities of the skate also enable it to be used with little, if any, noise, and diminish the danger of injuring the surface upon which the skating is done.

I do not claim to be the first inventor of a wheel with an elastic periphery, nor to have invented roller-skates with rollers of hard wood or metal; but

What I claim as my invention, and desire to secure by Letters Patent, is—

A roller-skate which is a combination of a foot-stock with rollers made elastic by india-rubber or gutta-percha, the combination operating substantially as herein set forth.

In testimony whereof I have hereunto subscribed my name.

REUBEN SHALER.

Witnesses:

GEORGE N. WILCOX,
MARTIN L. DOWD.